(12) United States Patent
Obrecht et al.

(10) Patent No.: US 6,184,296 B1
(45) Date of Patent: Feb. 6, 2001

(54) RUBBER MIXTURES CONTAINING SURFACE-MODIFIED CROSS-LINKED RUBBER GELS

(75) Inventors: Werner Obrecht, Moers; Thomas Scholl, Gladbach; Ulrich Eisele, Leverkusen; Winfried Jeske, Burscheid, all of (DE)

(73) Assignee: Bayer AG, Leverkusen (DE)

( * ) Notice: Under 35 U.S.C. 154(b), the term of this patent shall be extended for 0 days.

(21) Appl. No.: 09/007,337

(22) Filed: Jan. 14, 1998

(30) Foreign Application Priority Data

Jan. 17, 1997 (DE) ................................. 197 01 489

(51) Int. Cl.[7] ................................. C08L 47/00; C08L 7/00
(52) U.S. Cl. ........................... 525/232; 525/233; 525/236
(58) Field of Search ..................... 525/236, 237, 525/233, 232; 221/222, 223

(56) References Cited

U.S. PATENT DOCUMENTS

| | | | | |
|---|---|---|---|---|
| 4,647,625 | * | 3/1987 | Aonuma | 528/232 |
| 5,124,408 | | 6/1992 | Engels et al. | 525/215 |
| 5,395,891 | | 3/1995 | Obrecht et al. | 525/194 |

FOREIGN PATENT DOCUMENTS

| | | |
|---|---|---|
| 42 205 563 | 1/1994 | (DE) . |
| 405216 | 1/1991 | (EP) . |
| 05 33 015 | 3/1993 | (EP) . |
| 1078400 | 8/1967 | (GB) . |

OTHER PUBLICATIONS

I. Franta, *Elastomers and Rubber Compounding Materials*, Ch. 4.2.1.1 (Production of emulsion SBR), Elsevier, Amsterdam, pp. 88–92 (1989).

European Search Report for EP 98 10 0051 (May 19, 1998).

* cited by examiner

*Primary Examiner*—Christopher Henderson
(74) *Attorney, Agent, or Firm*—Connolly Bove Lodge & Hutz LLP

(57) ABSTRACT

The rubber mixtures containing modified rubber gels according to the invention prepared from at least one rubber gel modified with compounds containing sulphur and reactive towards C=C double bonds and at least one rubber containing double bonds are preferable suitable for the production of vulcanizates which have an unusually strong reinforcing action in rubber vulcanizates. The vulcanisates furthermore exhibit unusually low dynamic damping at relatively elevated temperatures. They are thus particularly suitable for the production of low rolling resistance motor vehicle tire treads.

16 Claims, No Drawings

RUBBER MIXTURES CONTAINING SURFACE-MODIFIED CROSS-LINKED RUBBER GELS

BACKGROUND OF THE INVENTION

1. Field of the Invention

This invention relates to mixtures prepared from rubbers containing C=C double bonds and rubber gels modified by chemicals having a vulcanizing action and to vulcanizates produced therefrom. The vulcanizates exhibit an unusually high reinforcing action as a filler in rubber vulcanisates and unusually low dynamic damping at relatively elevated temperatures and are thus particularly suitable for the production of low rolling resistance motor vehicle tire treads.

2. Description of the Prior Art

Many methods for reducing the rolling resistance of tires have been described in the literature, including inter alia the use of polychloroprene gels (EP-A 405 216) and polybutadiene gels (DE-A 42 20 563) in tire treads made from rubbers containing C=C double bonds. The disadvantage of using these two rubber gels as a filler in rubber vulcanizates is their relatively low reinforcing action in comparison with carbon black. The sulphur-vulcanized rubber gels described in British patent GB 1 078 400 as processing auxiliaries exhibit no reinforcing properties and are thus not suitable for replacing filler in tire treads.

SUMMARY OF THE INVENTION

It has now been found that specific subsequently chemically modified rubber gels in vulcanizates prepared from rubbers containing C=C double bonds have a surprisingly strong reinforcing action as a filler and are thus better suited, for example, for the production of low rolling resistance tires than the original, unmodified rubber gels.

The present invention accordingly provides mixtures prepared from at least one rubber gel modified with compounds containing sulphur which are reactive towards C=C double bonds (chemicals having a vulcanising action) (A) and at least one rubber containing double bonds (B), wherein the proportion of modified rubber gel is 1 to 100 parts by weight, preferably 5 to 75 parts by weight, relative to 100 parts by weight of rubber containing C=C double bonds, optionally together with further fillers and rubber auxiliary substances.

DESCRIPTION OF THE PREFERRED EMBODIMENTS

Rubber gels are taken to mean microgels (A) produced by crosslinking

| | |
|---|---|
| BR | polybutadiene |
| ABR | butadiene/acrylic acid $C_{1-4}$ alkyl ester copolymers |
| IR | polyisoprene |
| NR | natural rubber |
| SBR | styrene/butadiene copolymers having styrene contents of 1 to 60, preferably 2 to 50 wt. % |
| XSBR | styrene/butadiene copolymers and graft polymers with further unsaturated polar monomers, such as acrylic acid, methacrylic acid, acrylamide, methacrylamide, N-methoxymethylmethacrylamide, N-acetoxymethylmethacrylamide, acrylonitrile, hydroxyethyl acrylate and/or hydroxyethyl methacrylate having styrene contents of 2 to 50 wt. % and copolymerised polar monomer contents of 1 to 20 wt. %, |
| IIR | isobutylene/isoprene copolymers having isoprene contents of 0.5 to 10 wt. % |
| BRIIR | brominated isobutylene/isoprene copolymers having bromine contents of 0.1 to 10 wt. % |
| ClIIR | chlorinated isobutylene/isoprene copolymers having chlorine contents of 0.1 to 10 wt. % |
| NBR | butadiene/acrylonitrile copolymers having acrylonitrile contents of 5 to 60, preferably 10 to 50 wt. % |
| HNBR | partially hydrogenated NBR rubber, in which up to 98.5% of the double bonds are hydrogenated |
| EPDM | ethylene/propylene/diene copolymers |
| | or mixtures thereof. |

The rubber gels surface-modified with chemicals having a vulcanizing action have particle diameters of 5 to 2000 nm, preferably of 20 to 600 nm (DVN value to DIN 53 206) and swelling indices ($Q_i$) in toluene of 1 to 15, preferably of 1 to 10. The swelling index is calculated from the weight of the gel containing solvent (after centrifugation at 20000 rpm) and the weight of the dry gel:

$Q_i$=wet weight of gel/dry weight of gel.

The swelling index is determined by swelling, for example, 250 mg of gel in 25 ml of toluene for 24 hours with shaking. The gel is centrifuged out from the solvent and weighed and then dried to constant weight at 70 C and reweighed.

The uncrosslinked rubber starting products are preferably produced by emulsion polymerization, cf in this connection, for example, I. Franta, *Elastomers and Rubber Compounding Materials*, Elsevier, Amsterdam 1989, pp. 88–92.

Crosslinking to produce the rubber gels proceeds in the latex state and may proceed, on the one hand, during polymerization by continuing polymerization to high conversions or, in the monomer feed process, by polymerization at elevated internal conversions or be performed after polymerization by post-crosslinking or also by a combination of both processes. Production by polymerization in the absence of chain-transfer agents is also possible.

The rubber may also be crosslinked by copolymerization with polyfunctional compounds having a crosslinking action. Preferred polyfunctional comonomers are compounds having at least two, preferably 2 to 4, copolymerisable C=C double bonds, such as diisopropenylbenzene, divinylbenzene, divinyl ether, divinyl sulphone, diallyl phthalate, triallyl cyanurate, triallyl isocyanurate, 1,2-polybutadiene, N,N'-m-phenylenemaleimide and/or triallyl trimellitate. Further compounds which may be considered are: the acrylates and methacrylates of polyhydric, preferably di- to tetrahydric, $C_2$ to $C_{10}$ alcohols, such as ethylene glycol, 1,2-propanediol, butanediol, hexanediol, polyethylene glycol having 2 to 20, preferably 2 to 8 oxyethylene units, neopentyl glycol, bisphenol A, glycerol, trimethylolpropane, pentaerythritol, sorbitol and unsaturated polyesters prepared from aliphatic di- and polyols together with maleic acid, fumaric acid and/or itaconic acid.

The rubbers may also be crosslinked in the latex form to yield rubber gels by post-crosslinking with chemicals having a crosslinking action. Suitable chemicals having a crosslinking action are, for example, organic peroxides, for example dicumyl peroxide, t-butylcumyl peroxide, bis-(t-butylperoxyisopropyl)benzene, di-t-butyl peroxide, 2,5-dimethylhexane-2,5-dihydroperoxide, 2,5 -dimethylhex-3 -yne-2,5-dihydroperoxide, dibenzoyl peroxide, bis-(2,4-dichlorobenzoyl) peroxide, t-butyl perbenzoate, as well as organic azo compounds, such as azobisiso-butyronitrile and azobiscyclohexanenitrile, as well as di- and polymercapto compounds, such as dimercaptoethane, 1,6-dimercaptohexane, 1,3,5-trimercapto-triazine and mercapto-terminated polysulphide rubbers, such as mercapto-terminated reaction products of bis-chloroethyl formal with sodium polysulphide.

The optimum temperature for performing post-crosslinking is naturally dependent upon the reactivity of the crosslinking agent and it may be performed at temperatures from room temperature to approx. 170 C, optionally under elevated pressure; c.f. in this connection, *Houben-Weyl, Methoden der organischen Chemie*, 4$^{th}$ edition, volume 14/2, page 848. Peroxides are particularly preferred crosslinking agents.

Particle enlargement by agglomeration may optionally also be performed before, during or after post-crosslinking in the latex form.

Rubbers which were produced in organic solvents may also be used as starting products for the production of the rubber gels. In this case, it is advisable to emulsify the solution of the rubber in water, optionally with the assistance of an emulsifier, and subsequently to crosslink the resultant emulsion with suitable crosslinking agents before or after removal of the organic solvent. Suitable crosslinking agents are those mentioned above.

The phrase "modification with chemicals having a vulcanising action" is taken to mean the chemical reaction of the already crosslinked rubber particles with chemicals containing sulphur which are reactive towards C=C double bonds.

These are in particular those compounds by means of which reactive groups containing sulphur, such as for example mercapto, dithiocarbamate, polysulphide, xanthogenate, thiobenzothiazole and/or dithiophosphoric acid groups, may be chemically bonded to the rubber particles.

Particularly preferred modification reactions involve the reaction of the already crosslinked rubber particles with:

elemental sulphur, hydrogen sulphide and/or alkyl polymercaptans, such as 1,2-dimercaptoethane or 1,6-dimercaptohexane, and with dialkyl- and dialkylaryldithiocarbamates, such as the alkali metal salts of dimethyldithiocarbamate and/or dibenzyldithiocarbamate, furthermore with alkyl and aryl xanthogenates, such as potassium methyl xanthogenate and Na isopropyl xanthogenate, as well as the reaction with the alkali metal and alkaline earth metal salts of dibutyldithiophosphoric acid and dioctyldithiophosphoric acid. The stated reactions may advantageously also be performed in the presence of sulphur, wherein the sulphur is also incorporated by the formation of polysulphide bonds. Free-radical initiators, such as inorganic and organic peroxides and/or azo initiators, may be added for addition of these compounds.

The modification reactions may be performed at temperatures of 0 to 180 C, preferably of 20 to 95 C, optionally under a pressure of 1 to 30 bar. Modifications may be performed on the rubber gels in bulk or in the form of dispersions thereof, wherein in the latter case organic solvents or also water may be used as the reaction medium. Modification is particularly preferably performed in an aqueous dispersion of the crosslinked rubber.

The quantity of modifier used is determined by the activity thereof and the particular requirements placed thereon and is in the range from 0.05 to 20 wt. %, relative to the entire quantity of rubber gel used. A quantity of 0.5 to 5 wt. %, relative to the entire quantity of rubber gel, is particularly preferred.

Preferred rubbers (B) contain double bonds amounting to iodine values of at least 2, preferably 5 to 470. Iodine values are generally determined by addition of iodine chloride in acetic acid using the Wijs method, DIN 53 241, part 1. The iodine value states the quantity of iodine in grams which is chemically bound by 100 g of the material.

The rubbers (B) generally have Mooney viscosities ML 1+4/100 C (DIN 53 523) of 10 to 150, preferably of 20 to 120.

Preferred rubbers (B), in addition to natural rubber, are also synthetic rubbers. Preferred synthetic rubbers are described, for example, by I. Franta, *Elastomers and Rubber Compounding Materials*, Elsevier, New York 1989 or also in *Ullmann's Encyclopedia of Industrial Chemistry*, volume A23, VCH Verlagsgesellschaft, Weinheim 1993. They include, inter alia

| | |
|---|---|
| BR | polybutadiene |
| ABR | butadiene/acrylic acid $C_{1-4}$ alkyl ester copolymers |
| IR | polyisoprene |
| SBR | styrene/butadiene copolymers having styrene contents of 1 to 60, preferably 2 to 50 wt. % |
| XSBR | styrene/butadiene copolymers and graft polymers with acrylic acid, methacrylic acid, acrylonitrile, hydroxyethyl acrylate and/or hydroxyethyl methacrylate having styrene contents of 2 to 50 wt. % and copolymerised polar monomer contents of 1 to 30 wt. %, |
| IIR | isobutylene/isoprene copolymers |
| NBR | butadiene/acrylonitrile copolymers having acrylonitrile contents of 5 to 60, preferably 10 to 50 wt. % |
| HNBR | partially hydrogenated NBR rubber, in which up to 98.5% of the double bonds are hydrogenated |
| EPDM | ethylene/propylene/diene copolymers | and mixtures of these rubbers.

Rubbers of interest in particular for producing motor vehicle tires are especially natural rubber, emulsion SBR and solution SBR rubber having a glass transition temperature of above −50 C, which may optionally be modified with silyl ethers or other functional groups, as described, for example, in EP-A 447 066, together with polybutadiene rubber having an elevated cis-1,4 content, produced with catalysts based on Ni, Co, Ti, or Nd, as well as polybutadiene rubber having a vinyl content of 0 to 75%, and mixtures thereof.

The rubber mixtures according to the invention prepared from the styrene/butadiene rubber gel (A) and the rubbers containing double bonds (B) may additionally contain further fillers.

Particularly suitable fillers for the production of the rubber mixtures and vulcanizates according to the invention are carbon blacks. The carbon blacks to be used in this case are produced using the flame, furnace or gas black processes and have BET surface areas of 20 to 200 m$^2$/g, such as for example SAF, ISAF, IISAF, HAF, FEF or GPF blacks.

disperse silicas, produced for example by precipitation of silicate solutions or flame hydrolysis of silicon halides, having specific surface areas of 5 to 1000, preferably of 20 to 400 m$^2$/g (BET surface area) and having primary particle sizes of 5 to 400 nm. The silicas may optionally also take the form of mixed oxides with other metal oxides, such as for example Al, Mg, Ca, Ba, Zn and Ti oxides.

synthetic silicates, such as aluminium silicate, alkaline earth metal silicates such as magnesium silicate or calcium silicate, having BET surface areas of 20 to 400 m$^2$/g and primary particle diameters of 10 to 400 nm.

natural silicates, such as kaolin and other naturally occurring silicas.

metal oxides, such as zinc oxide, calcium oxide, magnesium oxide, aluminium oxide.

metal carbonates, such as mag,nesium carbonate, calcium carbonate, zinc carbonate.

metal sulphates, such as calcium sulphate, barium sulphate.

metal hydroxides, such as aluminium hydroxide and magnesium hydroxide.

glass fibers and glass fiber products (mats, strands) or glass microbeads.

rubber gels based on polychloroprene and/or polybutadiene having particle sizes of 5 to 1000 nm.

The stated fillers may be used alone or as a mixture. In a particularly preferred embodiment of the process, 10 to 100 parts by weight of modified rubber gel (A), optionally together with 0.1 to 100 parts by weight of carbon black and/or 0.1 to 100 parts by weight of light coloured fillers, in each case relative to 100 parts by weight of rubber containing double bonds (B), are used to produce the mixtures.

The rubber mixtures according to the invention may contain further rubber auxiliary substances, such as crosslinking agents, reaction accelerators, anti-oxidants, heat stabilizers, light stabilizers, ozone stabilizers, processing auxiliaries, plasticizers, tackifiers, blowing agents, dyes, pigments, waxes, extenders, organic acids, inhibitors, metal oxides and filler activators, such as triethanolamine, polyethylene glycol, hexanetriol, bis-(triethoxysilylpropyl) tetrasulphide, which are known in the rubber industry.

The rubber auxiliary substances are used in conventional quantities, which are determined, inter alia, by the intended application. Conventional quantities are, for example, quantities of 0.1 to 50 wt. %, relative to the quantities of rubber (B) used.

Sulphur, sulphur donors or peroxides may be used as conventional crosslinking agents. The rubber mixtures according to the invention may furthermore contain vulcanization accelerators. Examples of suitable vulcanization accelerators are mercaptobenzothiazoles, -sulphenamides, guanidines, thiurams, dithiocarbamates, thioureas and thiocarbonates. The vulcanization accelerators and sulphur or peroxides are used in quantities of 0.1 to 10 wt. %, preferably 0.1 to 5 wt. %, relative to the entire quantity of rubber (B).

The rubber mixtures according to the invention may be vulcanized at temperatures of 100 to 200 C, preferably of 130 to 180 C, optionally under a pressure of 10 to 200 bar.

The rubber mixtures according to the invention prepared from modified rubber gel (A) and the rubbers containing C=C double bonds (B) may be produced in various manners: firstly, it is, of course, possible to mix the individual components as solids. Equipment suitable for this purpose includes, for example, roll mills, internal mixers or compounding extruders. Mixing may, however, also be performed by combining the latices of the uncrosslinked rubbers. The mixtures according to the invention produced in this manner may, as is conventional, be isolated by evaporation, precipitation or freeze-coagulation (c.f. U.S. Pat. No. 2,187,146). The mixtures according to the invention may be obtained directly as rubber/filler formulations by incorporating fillers into the latex mixtures and subsequently working them up.

Further blending of the rubber mixtures prepared from the modified rubber gel (A) and the rubbers containing double bonds (B) with additional fillers and optionally rubber auxiliary substances may be performed in conventional mixing units, such as roll mills, internal mixers and compounding extruders. Preferred mixing temperatures are 50 to 180 C.

The rubber vulcanizates according to the invention are suitable for the production of moldings, for example for the production of cable sheathing, tubes, drive belts, conveyor belts, roller coverings, tires, in particular tire treads, shoe soles, sealing rings and damping components.

EXAMPLES

Example 1

(a) Crosslinking BR rubber in latex form 3071.7 g of a BR latex (GB 1/5) having a particle size of 87 nm (DVN) and a solids content of 29.3 wt. % were combined in an autoclave at 60 C with 13.5 g of dicumyl peroxide (1.5 wt. % relative to solid rubber). The mixture was then stirred under a nitrogen atmosphere for 2 hours at 60 C and the temperature was then raised to 150 C and stirring continued for 45 minutes at this temperature. Once the mixture had cooled, it was filtered through a Monodur cloth (pore size 0.2 mm). The crosslinked rubber latex had a solids content of 29.3 wt. %, the swelling index was 4. Particle diameter: 85 nm.

(b) Modification of the crosslinked rubber latex with sulphur and sodium isopropyl xanthogenate 3069 g of the latex according to Example 1(a) were placed in a vessel together with 34.4 g of a sulphur dispersion having a sulphur content of 51 wt. %, which contained, in addition to sulphur, 0.9 wt. % of dispersant, 0.08 wt. % of ZnO and 0.1 wt. % of MgO, and 450 g of water. A solution of 13.14 g of Na isopropyl xanthogenate in 657 g of water was added dropwise within 15 minutes to this mixture and heated to 95 C for 5 hours. A solution of 4.5 g of $K_2S_2O_8$ in 450 g of water was then added dropwise at 50 C. Stirring was continued for 30 minutes at 50 C and 4678 g of a latex of surface-modified, crosslinked rubber having a solids content of 21% were obtained. Particle diameter: 85 nm (DVN). The degree of modification was 3 wt. % (relative to solids).

(c) Mixing the crosslinked, surface-modified BR rubber with uncrosslinked natural rubber 7.143 kg of the rubber latex treated in this manner were then stirred into a mixture prepared from 5 kg of natural rubber latex having a solids content of 30 wt. %, 300 g of a 5% aqueous resin soap solution (Dresinate 731, manufacturer: Hercules) and 150 g of a 10% aqueous dispersion of the anti-oxidant Vulkanox 4020 (manufacturer: Bayer AG).

The resultant latex mixture contained crosslinked rubber and natural rubber in a 1:1 ratio by weight.

(d) Coagulation of the latex

In order to precipitate 3 kg of rubber mixture, 12.593 kg of the latex mixture obtained in processing stage (c) were stirred at 65 C into a solution of 225 g of NaCl, 40.8 g of $Al_2(SO_4)_3 \times 18H_2O$, 4.5 g of gelatine in 30 l of water, wherein the pH value was maintained at 4 by adding 10% $H_2SO_4$. The product was thoroughly washed with water and dried for 2 days at 70 C under a vacuum.

3 kg of a masterbatch were obtained consisting of 50 wt. % crosslinked, modified BR rubber particles and 50 wt. % natural rubber.

Example 2

(a) Latex of crosslinked polybutadiene rubber, produced according to Example 1(a)

(b) Modification of the crosslinked BR rubber latex with sulphur and sodium dibenzyldithiocarbamate 3068 g of the latex according to Example 1(a) were placed in a vessel together with 34.4 g of a sulphur dispersion having a sulphur content of 51 wt. %, which contained, in addition to sulphur, 0.9 wt. % of dispersant, 0.08 wt. % of ZnO and 0.1 wt. % of MgO, and 27 g of the emulsifier Mersolat K 30 (Bayer AG) and 300 g of water. A solution of 49.1 g of Na dibenzyldithiocarbamate in 393 g of water was added dropwise within 15 minutes to this mixture and heated to 95 C for 5 hours. A solution of 9 g of $K_2S_2O_8$ in 1000 g of water was then added dropwise at 50 C. Stirring was continued for 30 minutes at 50 C and 4881 g of a latex of modified, crosslinked rubber having a solids content of 21% were obtained. Particle diameter: 85 nm (DVN). Degree of modification: 7 wt. % (relative to solids).

(c) Mixing the crosslinked, modified BR rubber with uncrosslinked natural rubber Mixing, was performed in accordance with Example 1(c), wherein, instead of the modified latex 1(b), the same amount of the corresponding latex from Example 2(b) was used.

(d) Coagulation of the latex

Coagulation was performed in accordance with Example 1(d), wherein, instead of the latex 1(c), the same amount of the corresponding latex from Example 2(c) was used.

3 kg of a masterbatch were obtained consisting of 50 wt. % crosslinked, modified BR rubber particles and 50 wt. % natural rubber.

Example 3

(a) Crosslinking of SBR rubber in latex form

A styrene/butadiene rubber latex (Baystal T 730/2) having a solids content of 30.2 wt. %, a particle size of approx. 400 nm (DVN) and a copolymerized styrene content of 24 wt. % was crosslinked with 1.5 wt. % of dicumyl peroxide, relative to solids, using the process of Example 1(a). After filtration through a filter cloth, a latex of crosslinked rubber having a solids content of 30.18 wt. % was obtained. Particle diameter was 400 nm.

(b) Modification of the crosslinked SBR rubber latex with sulphur and sodium isopropyl xanthogenate 2982 g of the latex according to Example 3(a) were placed in a vessel together with 34.4 g of a sulphur dispersion having a sulphur content of 51 wt. %, which contained, in addition to sulphur, 0.9 wt. % of dispersant, 0.08 wt. % of ZnO and 0.1 wt. % of MgO, and 500 g of water. A solution of 13.14 g of Na isopropyl xanthogenate in 644 g of water was added dropwise within 15 minutes to this mixture and heated to 95 C for 5 hours. A solution of 4.5 g, of $K_2S_2O_8$ in 500 g of water was then added dropwise at 50 C. Stirring was continued for 30 minutes at 50 C and 4678 g of a latex of modified, crosslinked SBR rubber having a solids content of 21 wt. % were obtained. Particle diameter was approx. 450 nm (DVN) and the swelling index 5. Degree of modification: 3 wt. % (relative to solids).

(c) Mixing the crosslinked, modified SBR rubber with uncrosslinked natural rubber Mixing was performed in accordance with Example 1(c), wherein, instead of the modified latex 1(b), the same amount of the corresponding latex from Example 3(b) was used.

(d) Coagulation of the latex

Coagulation was performed in accordance with Example 1(d), wherein, instead of the latex 1(c), the same amount of the corresponding latex from Example 3(c) was used.

3 kg of a masterbatch were obtained consisting of 50 wt. % crosslinked, modified SBR rubber particles and 50 wt. % natural rubber.

Example 4

The following mixtures were produced in an internal mixer at 130 C. On completion, sulphur and accelerator were added in the roll mill at 50 C. The stated quantities are parts by weight.

| | A | B | C | Comparison |
|---|---|---|---|---|
| BR/NR masterbatch (50:50 parts by weight) from Example 1d | 150 | — | — | — |
| BR/NR masterbatch (50:50 parts by weight) from Example 2d | — | 150 | — | — |
| SBR/NR masterbatch (50:50 parts by weight) from Example 3d | — | — | 150 | — |
| BR/NR masterbatch (50:50 parts by weight) according to Example 1 but without the modification reaction (stage 1b) | — | — | — | 150 |
| Natural rubber TSR5 Defo 700 | 25 | 25 | 25 | 25 |
| Plasticiser Renopal 450 | 3 | 3 | 3 | 3 |
| Ozone protection wax, Antilux L (Rheinchemie) | 1.5 | 1.5 | 1.5 | 1.5 |
| Stearic acid | 3 | 3 | 3 | 3 |
| Zinc oxide | 3 | 3 | 3 | 3 |
| Anti-oxidant Vulkanox 4010 NA (Bayer AG) | 1 | 1 | 1 | 1 |
| Sulphur | 1.6 | 1.6 | 1.6 | 1.6 |
| N-tert.-butylmercaptobenzothiazole sulphenamide Vulkacit NZ (Bayer AG) | 1 | 1 | 1 | 1 |
| Vulcanization time at 160 C in minutes | 15 | 15 | 15 | 15 |
| Tensile strength (MPa) | 23.2 | 22.8 | 18.5 | 23.5 |
| Elongation at break (%) | 515 | 550 | 460 | 620 |
| Modulus at 100% elongation (MPa) | 2.6 | 2.2 | 2.3 | 1.7 |
| Modulus at 300% elongation (MPa) | 12.4 | 10.3 | 11.7 | 8.8 |
| Hardness at 23 C (Shore A) | 66 | 63 | 59 | 61 |
| Rebound resilience at 23 C (%) | 42 | 41 | 54 | 40 |
| Rebound resilience at 70 C (%) | 62 | 61 | 71 | 56 |

It is evident from the test results that the surface treatment according to the invention of the rubber gels has given rise to a considerable improvement in effectiveness. Modulus at 100 to 300% extension has thus risen distinctly and rebound resilience at 70 C, which experience has shown accompanies a lower rolling resistance, is increased.

Example 5

(a) Crosslinking of SBR rubber in latex form

In a similar manner to the method of Example 1(a), a styrene/butadiene latex containing 24.8 wt. % of copolymerized styrene relative to solids, of a particle size of 110 nm (DVN) and a solids content of 30 wt. % is crosslinked with 1.5 wt. % of dicumyl peroxide relative to the polymer. A rubber latex having a solids content of 30.1 wt. % was obtained. The rubber gel had a swelling index of 12.1.

(b) Modification of the crosslinked SBR rubber latex with 1,6-hexanedithiol 2990 g of the latex according to Example 5(a) were placed in a vessel together with 27 g of the emulsifier Mersolat K 30 (Bayer AG), 20.02 g of 1,6-hexane-dithiol and 1000 g of water. A solution of 18 g of potassium peroxydisulphate in 770 g of water was added dropwise to this mixture within 3 hours at 30 C and the temperature raised to 70 C for 1 hour. 4825 g of a latex of modified, crosslinked SBR rubber having a solids content of 20.5 wt. % were obtained. The particle diameter was approx. 121 nm (DVN) and the swelling index 5. Degree of modification: 2.2 wt. % (relative to solids).

(c) Mixing the crosslinked, modified SBR rubber with uncrosslinked natural rubber.

Mixing was performed in accordance with Example 1(c), wherein, instead of the modified latex 1(b), the same amount of the corresponding latex from Example 5(b) was used.

(d) Coagulation of the latex

Coagulation was performed in accordance with Example 1(d), wherein, instead of the latex 1(c), the same amount of the corresponding latex from Example 5(c) was used.

3 kg of a masterbatch were obtained consisting of 50 wt. % crosslinked, modified SBR rubber particles and 50 wt. % natural rubber.

Example 6

The following mixtures were produced in an internal mixer at 130 C. On completion, sulphur and accelerator were added in the roll mill at 50 C. The stated quantities are parts by weight.

|  | A | Comparison |
|---|---|---|
| SBR/NR masterbatch (50:50 parts by weight) from Example 5d | 150 | — |
| SBR/NR masterbatch (50:50 parts by weight) from Example 5 but without the modification reaction (stage 5b) | — | 150 |
| Natural rubber TSR5 Defo 700 | 25 | 25 |
| Plasticiser Renopal 450 | 3 | 3 |
| Ozone protection wax, Antilux L (Rheinchemie) | 1.5 | 1.5 |
| Stearic acid | 3 | 3 |
| Zinc oxide | 3 | 3 |
| Anti-oxidant Vulkanox 4010 NA (Bayer AG) | 1 | 1 |
| Sulphur | 1.6 | 1.6 |
| N-tert.-butylmercaptobenzothiazole sulphenamide Vulkacit NZ (Bayer AG) | 1 | 1 |
| Vulcanization time at 160 C in minutes | 15 | 15 |
| Tensile strength (MPa) | 23.8 | 21.1 |
| Elongation at break (%) | 565 | 585 |
| Modulus at 100% elongation (MPa) | 2.5 | 2 |
| Modulus at 300% elongation (MPa) | 9.7 | 8.6 |
| Hardness at 23 C (Shore A) | 72 | 63 |
| Rebound resilience at 23 C (%) | 36 | 35 |
| Rebound resilience at 70 C (%) | 48 | 52 |

What is claimed is:

1. A rubber mixture comprising a reaction product of
   (A) about 1 to 50 wt. % of at least one surface-modified, cross-linked rubber gel which has been surface-modified after having been cross-linked with about 0.05 to 20 wt. % of at least one sulfur-containing compound which is reactive towards C=C double bonds, with
   (B) about 50 to 99 wt. % of at least one rubber compound containing double bonds, optionally, a filler, and optionally, a rubber auxiliary substance.

2. A rubber mixture comprising a reaction product of
   (A) about 1 to 50 wt. % of at least one surface-modified, cross-linked rubber gel, which has been surface-modified after having been cross-linked with about 0.05 to 20 wt. % of at least one sulfur-containing compound which is reactive towards C=C double bonds, wherein the at least one surface-modified, cross-linked rubber gel has a swelling index in toluene of 1 to 15, with
   (B) about 50 to 99 wt. % of at least one rubber compound containing double bonds, optionally, a filler, and optionally, a rubber auxiliary substance.

3. A rubber mixture comprising a reaction product of
   (A) about 1 to 50 wt. % of at least one surface-modified, cross-linked rubber gel having a particle size of 5 to 2000 nm which has been surface-modified after having been cross-linked with about 0.05 to 20 wt. % of at least one sulfur-containing compound which is reactive towards C=C double bonds, wherein the at least one surface-modified, cross-linked rubber gel has a particle size of 5 to 2000 nm, with
   (B) about 50 to 99 wt. % of at least one rubber compound containing double bonds, optionally, a filler, and optionally, a rubber auxiliary substance.

4. The rubber mixture according to claim 2, wherein the swelling index in toluene is from 1 to 10.

5. The rubber mixture according to claim 3, wherein the particle size is from 20 to 600 nm.

6. The rubber mixture according to claim 1, wherein from about 0.5 to 5 wt. % of the at least one sulfur-containing compound which is reactive towards C=C double bonds has been used to modify the at least one cross-linked rubber gel.

7. The rubber mixture according to claim 1, wherein the at least one cross-linked rubber gel before surface-modification is a crosslinked microgel of BR, ABR, IR, NR, SBR, XSBR, IIR, BRIIR, Cl IIR, NBR, HNBR, EPDM, or a mixture thereof.

8. A rubber mixture comprising a reaction product of
   (A) about 1 to 50 wt. % of at least one surface-modified, cross-linked rubber gel which has been surface-modified after having been cross-linked with 0.05 to 20 wt. % of at least one sulfur-containing compound which is reactive towards C=C double bonds, wherein the at least one sulfur-containing compound which is reactive towards C=C double bonds is elemental sulfur, hydrogen sulphide, a mercapto compound, a dithiocarbamate, a polysulphide, a xanthogenate, a thiobenzothiazole, a dithiophosphoric acid, a salt thereof, or a mixture thereof, with
   (B) about 50 to 99 wt. % of at least one rubber compound containino double bonds, optionally, a filler, and optionally, a rubber auxiliary substance.

9. The rubber mixture according to claim 8, wherein the at least one sulfur-containing compound which is reactive towards C=C double bonds is an alkyl polymercaptan, a dialkyl or dialkylaryl dithiocarbamate, an alkyl or aryl xanthogenate, a dibutyldithiophosphoric acid or dioctyldithiophosphoric acid, an alkali metal salt or alkaline earth metal salt thereof, or a mixture thereof.

10. The rubber mixture according to claim 1, wherein the at least one double bond-containing rubber compound is BR, ABR, IR, SBR, XSBR, IIR, NBR, HNBR, EPDM, or a mixture thereof.

11. The rubber mixture according to claim 1, wherein the fillers are present and are carbon blacks, disperse silicas, synthetic or natural silicates, metal oxides, metal carbonates, metal sulphates, metal hydroxides, glass fibers, glass microbeads, rubber gels based on polychloroprene and/or polybutadiene, or a mixture thereof.

12. The rubber mixture according to claim 1, wherein the rubber auxiliary substances are present and are crosslinking agents, reaction accelerators, antioxidants, heat stabilizers, light stabilizers, ozone stabilizers, processing auxiliaries, plasticizers, tackifiers, blowing agents, dyes, pigments, waxes, extenders, organic acids, inhibitors, metal oxides, filler activators, or a mixture thereof.

13. The rubber mixture according to claim 1, further comprising an additive which is a vulcanization accelerator, a crosslinking agent, or a mixture thereof.

14. The rubber mixture according to claim 13 wherein the vulcanization accelerator is mercaptobenzothiazole,-sulphenamide, guanidine, thiuram, dithiocarbamate, thiourea, thiocarbonate, or a mixture thereof.

15. The rubber mixture according to claim 13, wherein the crosslinking agent is sulfur or a peroxide.

16. The rubber mixture according to claim 13, wherein the vulcanization accelerator or crosslinking agent is present in an amount of 0.1 to 10 wt. %, based on the total weight of the at least one double bond-containing rubber compound.

* * * * *